UNITED STATES PATENT OFFICE.

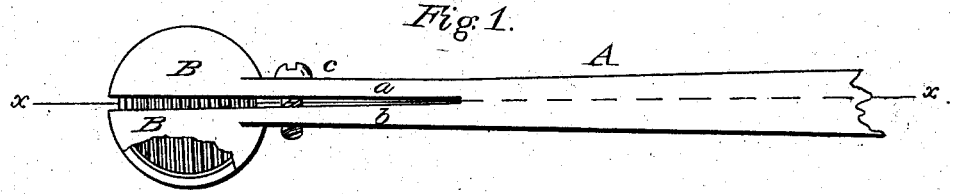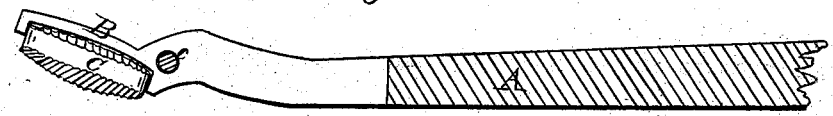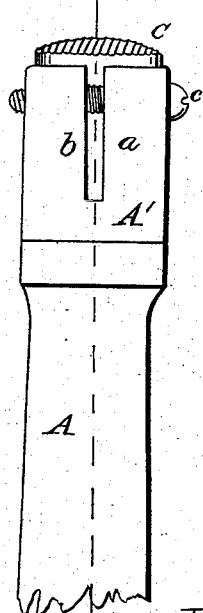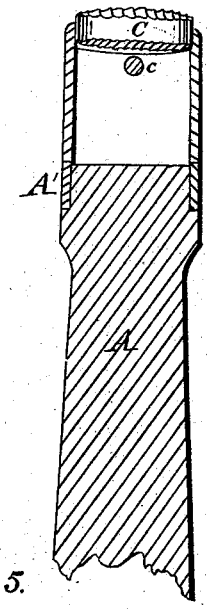

J. W. FOARD, OF SAN FRANCISCO, CALIFORNIA.

IMPROVED SHOE-MAKER'S FLOAT.

Specification forming part of Letters Patent No. 48,544, dated July 4, 1865.

*To all whom it may concern:*

Be it known that I, J. W. FOARD, of the city and county of San Francisco, State of California, have invented a new and useful Improvement in Shoe-Makers' Floats; and I do hereby declare that the following is a full, clear, and exact description thereof, which will enable others skilled in the art to make and use the same, reference being had to the accompanying drawings, forming part of this specification, in which—

Figure 1 represents a float made after my invention, the form of the handle being such as to enable the float to reach the forward parts of boots and shoes. Fig. 2 is a section thereof on the line $x$ of Fig. 1. Fig. 3 is an elevation of a float whose handle is made so as to operate the float in the back parts of boots and shoes; and Fig. 4 is a section thereof, taken on the line $y$ of Fig. 3. Fig. 5 is a plan of one of the files or cutters.

Similar letters of reference indicate like parts.

This invention consists in a new construction of shoe-makers' floats for removing pegs and nails from the inner surfaces of the soles of boots and shoes. The cutting parts are made separate from the handles. They are also made with cutting-surfaces of steel on both their faces, and are so attached to their handles as to be readily turned over or changed when one of said surfaces becomes dull.

The letter A designates the handles of the floats.

C are the cutting parts or files. They are made of steel, or of steel faces with cutting or file edges. They may be of any suitable shape, but in this example of my invention are made circular, like a disk.

In Fig. 1 I have shown a handle made of metal and forked at that end which receives the cutter.

B B are the halves of a circular back formed on the forked end of the handle, the upper side of said back being recessed so that the cutter C will fit in it, as seen in the drawings. The tines or limbs $a\ b$ of the fork are drawn together by means of a screw, $c$, thereby holding and clamping the cutter in the back B B.

The periphery of the cutters C may be made slightly concave, so as to enable the edges or flanges of the back B B to obtain a better hold.

The form of float shown in Figs. 1 and 2 is adapted for smoothing the forward part of boots and shoes.

Figs. 3 and 4 show the cutter fitted to a handle whose form is adapted for smoothing the hinder parts of boots and shoes.

The handle is shown to be made of wood with a socket-piece A' fitted on its end. This socket-piece is bifurcated toward its outer end, its sides $a$ and $b$ being drawn together by a screw, $c$, which passes through both.

The cutter C is held between the ends of the parts $a\ b$. The cutters of shoe-makers' floats now in use are made either of soft material, so that their edges may be formed by means of a file, or they are made of cast-iron hardened in the process of casting, in neither having a keen fine edge when new, whereas my cutters are nothing more nor less than steel files made like other files for operating upon metals or other hard substances, and, like them, hardened after the teeth are formed, thus giving a fine and durable edge. The stocks or handles are so constructed that it is only necessary to turn the cutters when a fresh cutting-surface is needed, and when the cutters are worn out on both sides new cutters C may be used in the same stocks.

I claim as new and desire to secure by Letters Patent—

1. Constructing shoe-makers' floats so that the cutters are separate from the stock and are held therein by means of a clamping-screw, substantially as above described.

2. Making the cutters C with double faces, substantially as described.

J. W. FOARD.

Witnesses:
S. J. SWEET,
H. H. McALLISTER.